UNITED STATES PATENT OFFICE.

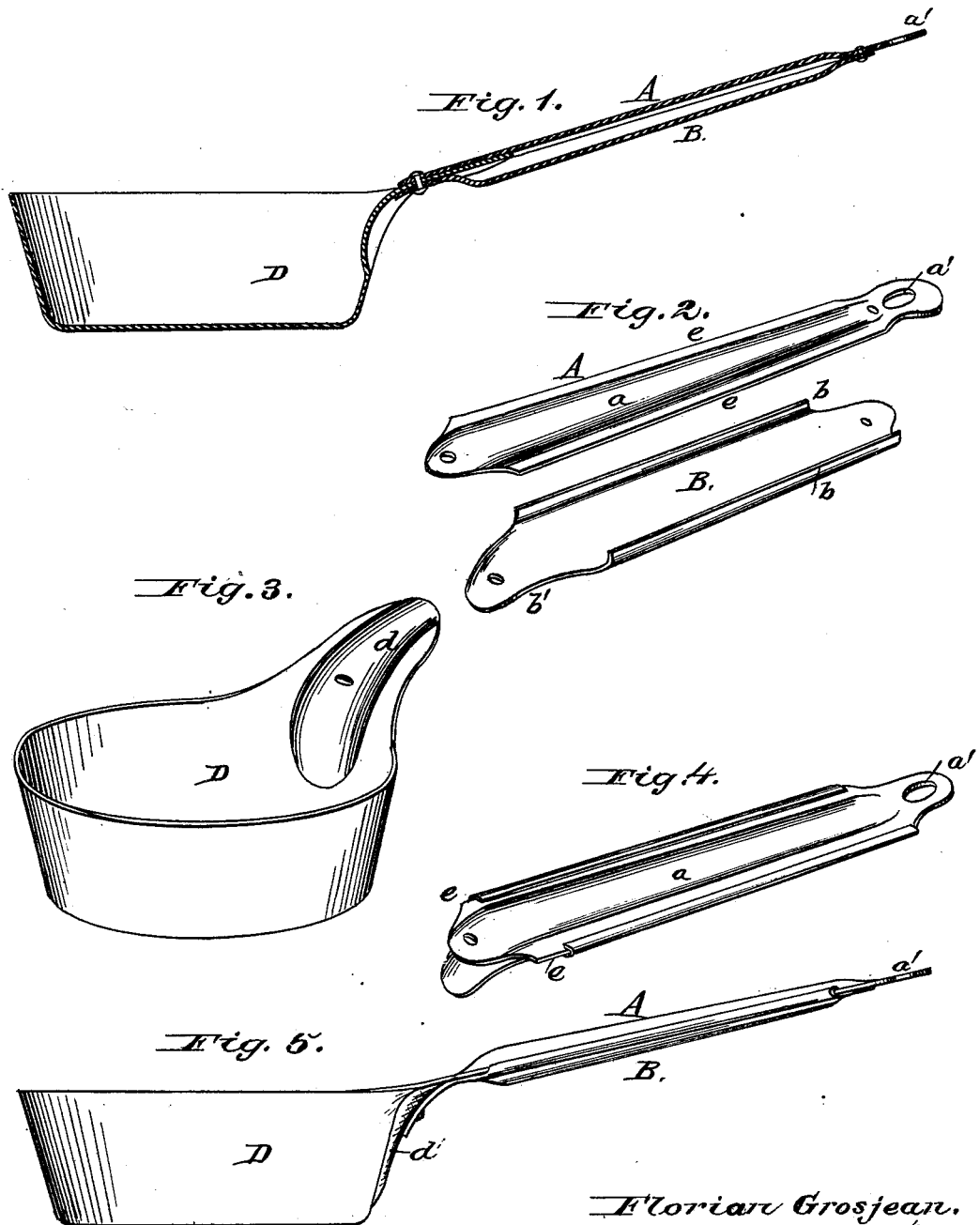

FLORIAN GROSJEAN, OF NEW YORK, N. Y., ASSIGNOR TO LALANCE & GROSJEAN MANUFACTURING COMPANY, OF SAME PLACE.

IMPROVEMENT IN HANDLES FOR SHEET-METAL VESSELS.

Specification forming part of Letters Patent No. 204,319, dated May 28, 1878; application filed March 16, 1878.

*To all whom it may concern:*

Be it known that I, FLORIAN GROSJEAN, of New York city, in the county of New York and State of New York, have invented certain new and useful Improvements in Handles for Sheet-Metal Vessels or Utensils, of which the following is a specification:

This invention relates to an improvement in separate handles for skillets, sauce-pans, fire-shovels, and similar sheet-metal vessels or utensils; and its object is to provide such a vessel or utensil with a strong, firmly attached, and braced handle, convenient in shape for grasping by the hand, and formed separately from the body, and in the construction of which may be utilized small pieces of sheet metal which would otherwise be discarded as scraps.

To this end my invention consists in the combination, with a metal vessel or utensil having an outwardly-projecting lip, provided with a longitudinal rib which extends partly across the wall of said vessel, of a handle consisting of two concavo-convex sheet-metal shells, the longitudinal margins of one of which are bent over and closely upon the corresponding margins of the other, the outer end of the handle thus formed being closed, and the two parts there riveted together, and the other and wider end embracing and riveted to the lip of the vessel or utensil, which lip lies between the two shells, resting against the upper one, and assisting in bracing the junction of the handle and body against strain when said vessel or utensil is in use.

For a more perfect understanding of my invention, I will describe it with reference to the accompanying drawing, in which—

Figure 1 is a longitudinal section through the handle and diametrically through the body of a skillet as constructed and connected according to my invention. Fig. 2 is a perspective view of the two shells of which the handle is composed. Fig. 3 is a perspective view of the skillet-body, showing the form of the top. Fig. 4 is a perspective view of the handle complete, and Fig. 5 is a modification of the invention.

The letter A indicates the upper, and B the lower, shell of which the handle is composed.

The upper shell is prolonged at its outer end to form an eye, $a'$, by which a vessel may be suspended, and while the main portion of said shell consists of the struck-up portion $a$, flaring laterally toward the other and pointed end, its longitudinal edges $e$ are flat. The lower shell has its concavity in the opposite direction to the upper shell, and its edges flanged, as at $b\ b$, these flanges being bent down snugly upon the edges of the upper shell when the two shells are placed together to form a handle, as in Fig. 4. Both ends of this lower shell are pointed, the point of its wider end $b'$ being dished or concaved oppositely to the main portion of said shell, and the point of its outer end $c$ is also slightly dished to lie against the under surface of the top shell where the two shells are riveted together. When the two parts are placed together the flanges of the lower shell do not cover the entire length of the edges of the upper; but the two ends are left separate, as shown in Fig. 4, in order that the struck-up concavo-convex lip $d$ of the skillet-body D may be inserted between them, the convex upper surface of said lip resting against the concave lower surface of the upper shell, while the convex upper surface of the pointed end $b'$ of the lower shell lies against the concave surface of the skillet-lip. In this position the two pointed ends of the parts of the handle and the lip are riveted together by a rivet which passes through all three, as shown in Fig. 1.

It is, of course, immaterial what the nature of the vessel or utensil may be, so long as it is adapted to have a lip similar to the lip $d$ formed thereon, and the convexity of the said lip may be upon its outer surface, if desired, in which case the inner portion of the upper shell of the handle should be dished to fit therein, as shown at $d'$ in Fig. 5.

In the manufacture of struck-up sheet-metal vessels, as hereinbefore described, it is not necessary to use such large sheets of metal in forming the blanks therefor as when the body and half of the hollow handle are formed in one piece of metal, and the small pieces resulting from cutting blanks for various articles may be utilized to form the shells for the handle. At the same time the handle is thoroughly braced and the vessel attached thereto sufficiently firmly for all practical use, so that an efficient article is provided at much less cost to the public than any of similar character heretofore produced.

I am aware that a sheet-metal vessel having its handle formed of two shells, so as to give it a convenient shape for grasping by the hand, is not new; but so far as I am aware one of the shells has heretofore always been formed in one piece with the vessel.

I am also aware that handles have been provided with jaws for embracing the lips of the vessels to which attached. My invention has an entirely different object from either of these devices, and constitutes an improvement upon both, affording, as it does, the advantages of a hollow and separate handle.

What I claim is—

The combination, with a metal vessel or utensil having an outwardly-projecting lip, provided with a longitudinal rib which extends partly across the wall of said vessel, of a handle consisting of two concavo-convex sheet-metal shells, the longitudinal margins of one of which are bent over and closely upon the corresponding margins of the other, the outer end of the handle thus formed being closed, and the two parts there riveted together, and the other and wider end embracing and riveted to the lip of the vessel or utensil, which lip lies between the two shells, resting against the upper one, and assisting in bracing the junction of the handle and body against strain when said vessel or utensil is in use, substantially as set forth.

In testimony that I claim the foregoing I have hereunto set my hand in the presence of the subscribing witnesses.

F. GROSJEAN.

Witnesses:
THOMAS COCHRAN,
JAMES COCHRAN.